March 15, 1932.  C. A. DUPUIS  1,849,915
WINDSHIELD WIPER
Filed May 8, 1930
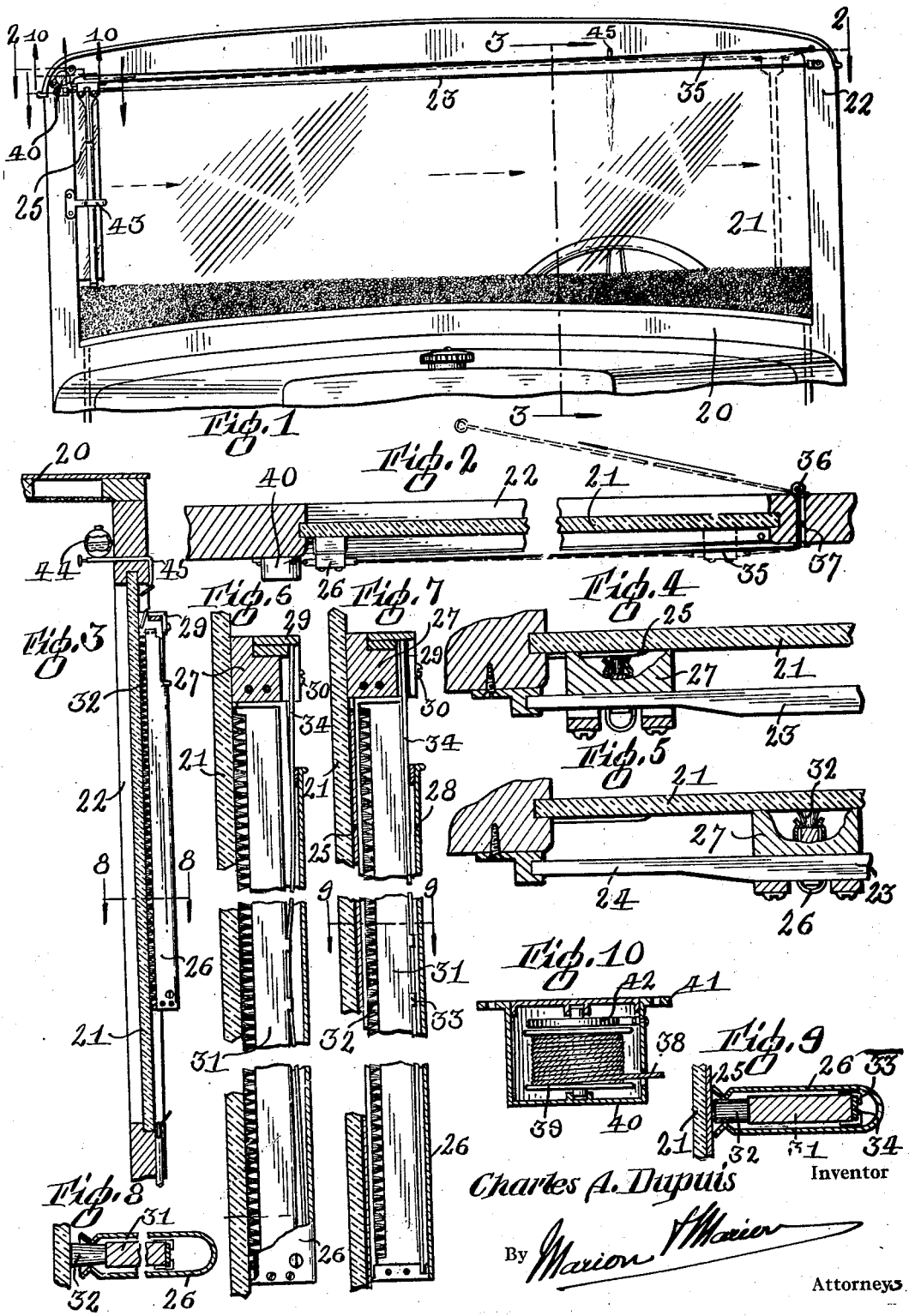

Patented Mar. 15, 1932

1,849,915

UNITED STATES PATENT OFFICE

CHARLES A. DUPUIS, OF MONTREAL, QUEBEC, CANADA

WINDSHIELD WIPER

Application filed May 8, 1930. Serial No. 450,857.

The present invention relates to improvements in vehicle windshield wipers and has for its primary object the provision of a wiper which will be entirely enclosed when inactive so as to protect the wiping element from the elements and to avoid the accumulation of dirt and foreign matter thereon.

A further object of the invention is the provision of an improved windshield wiper construction designed to more effectively clean the windshield glass and to avoid the formation of streaks thereon.

Another object of the invention is the provision of a windshield wiping mechanism having means for removing snow and frost from the windshield.

Still another object of the invention is the provision of a windshield wiper which may be manually operated without great effort.

Other objects and advantages of the invention will become apparent as the description progresses.

In the accompanying drawings forming a part of this specification and in which like reference characters are employed to designate corresponding parts throughout the same:

Figure 1 is a front elevational view of a vehicle illustrating the windshield thereof, Figure 2 is a horizontal section taken on the line 2—2 of Figure 1, Figure 3 is a transverse section taken on the line 3—3 of Figure 1, showing the wiper in operative arrangement, Figure 4 is an enlarged fragmentary section taken on the line 4—4 of Figure 1, with the wiper in inactive arrangement, Figure 5 is a similar view showing the wiper disposed in operative arrangement, Figure 6 is a longitudinal section through the wiper structure showing the wiper in an operative arrangement, Figure 7 is a similar view showing the wiper in inactive arrangement, Figure 8 is an enlarged section taken on the line 8—8 of Figure 3, Figure 9 is a similar view taken on the line 9—9 of Figure 7, and Figure 10 is an enlarged section taken on the line 10—10 of Figure 1.

Referring to the drawings, wherein for the purpose of illustration is shown a preferred embodiment of the invention, the numeral 20 generally designates a conventional type of automobile equipped with the common form of glass windshield 21 mounted within a marginal frame 22.

Extending longitudinally across the windshield adjacent its upper edge and attached to the frame 22 is a flat, preferably metallic guide bar 23, cut down adjacent one end to provide a reduced portion 24. Attached to the windshield at one end is a vertically extending metallic strip 25, pressed firmly against the glass, as shown to advantage in Figures 1 and 4.

The wiper construction embodies an elongated metallic casing 26 of relatively flat tubular form attached at the uper end to a block 27 having the upper forward edge rabbeted. The upper exterior portion of the casing is cut away, as indicated at 28, to form a longitudinal slot. Secured to the block 27 so as to extend over the forward portion is an angular bracket 29 having vertically depending bifurcated flanges secured to the front face of the block by means of screws 30 and an upper horizontal flange fitting in the rabbeted portion of the block and disposed to overhang the guide bar 23 which operates in a recess formed between the upper flange of the bracket 29 and the lower rabbeted portion of the block.

Fitted within the casing 26 is an elongated wiper brush, including a back 31 extending outwardly and bristles 32 directed toward the windshield. On the intermediate portion of the back 31, at the outer edge, are formed a pair of spaced clips 33 which rigidly engage the intermediate portion of a longitudinally extending bar spring 34.

The spring 34, which is in the form of a relatively narrow spring metal bar, is bent longitudinally so that its central portion assumes an inward arcuate curvature. The lower end of the spring 34 engages a recess in the bottom of the casing 26, while the upper extremity overlies the front face of the block 27 between the forward flanges of the bracket 29, the upper end portion of the spring being disposed to contact with the outer edge of the guide bar 23.

The wiper is actuated from its normal inactive position at one extreme end of the windshield longitudinally across the windshield in operative movement by means of a rope 35, one end of which is attached to the bracket 29 while the opposed end carries a ring 36. The rope is trained through an opening 37 formed through the windshield frame 22 at the upper extreme corner opposed to the normal position of the wiper, adjacent the steering wheel to enable the operator to conveniently pull the same to slide the wiper over the windshield in one direction.

An opposed movement of the wiper is effected through the medium of a complementary rope 38 attached to the opposed side of the bracket 29 wound about and fastened to a winding drum 39 rotatably journaled in a casing 40. The casing is provided with laterally extending flanges 41 by means of which it is secured to the windshield frame. Connected with the side of the drum 39 and mounted within the casing in a spiral spring 42 designed to normally rotate the drum to retract the rope 38.

When the vehicle is inoperative, or during operation in clear weather, the windshield wiper is disposed at one end of the windshield, positioned upon the strip 25, actuated thereto and retained in position by the spring actuated winding mechanism. Furthermore, the wiper brush will have assumed a retracted position within the wiper casing 26 so that the bristles will be fully protected, the inner edge portion of the casing contacting with the strip 25 due to engagement with a holder arm 43 to tightly enclose the brush and protect the same from dirt and foreign matter.

When the vehicle is operated during a rain or snow fall, the wiper is periodically swept across the outer side of the windshield by engaging the ring 36 and pulling the rope 35, which will draw the wiper from its normal inoperative position longitudinally toward the opposed end of the windshield. During the operative movement of the windshield structure, the upper end of the spring bar 34 will be adjusted outwardly from its retracted arrangement in contact with the reduced portion of the guide bar 23 as it slides along the bar in engagement with the major relatively wide portion, the upper part of the spring bar thus acting as a lever fulcrumed between the upper extremity and the connecting clip 33 on the slotted portion of the casing to extend the brush inwardly toward the windshield so that the bristles will firmly contact therewith to effectively clean the same.

In order to facilitate the effective removal of frost which might accumulate on the windshield, means are provided for a fountain feed supply of a suitable dissolving liquid, this being effected by mounting a container or reservoir 44 against the inner side of the top rail of the windshield frame and extending an angular conducting pipe 45 forward through the frame and downwardly so that the discharge outlet will be disposed adjacent the upper edge of the windshield, as shown to advantage in Figure 3. A suitable control valve is mounted in the conduit for regulating the amount of fluid discharged upon the windshield. During the reciprocating movement of the wiper, the fluid will be uniformly distributed over the windshield to permit effective removal of the frost.

It is to be understood that the form of my invention herein shown and described is to be taken as a preferred example of the same, and that various changes as to the shape, size and arrangement of parts may be resorted to without departing from the spirit of the invention or the scope of the subjoined claim.

Having thus described my invention, I claim:

An apparatus of the character described comprising a longitudinally guide bar adapted to be mounted adjacent the windshield of a vehicle, a wiper casing extending transversely of the windshield having one end slidably connected with the guide bar, the said guide bar having the forward edge portion formed to provide an undulating contour, a brush adjustably mounted in the wiper casing, brush adjusting means adapted to urge the brush to an extended wiping position or to a retracted windshield disengaging position at predetermined positions of the windshield in correspondence with the undulating form of the guide bar, and means for slidably actuating the said wiper casing and brush in reciprocating movement over the windshield.

In witness whereof I have hereunto set my hand.

CHARLES A. DUPUIS.